March 31, 1970 HIROSHI INOSE ET AL 3,504,125

NETWORK SYNCHRONIZATION IN A TIME DIVISION SWITCHING SYSTEM

Filed July 19, 1967 6 Sheets-Sheet 1

INVENTORS
HIROSHI INOSE
HIROYA FUJISAKI
TADAO SAITO
BY
R. C. Winter
ATTORNEY

NETWORK SYNCHRONIZATION IN A TIME DIVISION SWITCHING SYSTEM

Filed July 19, 1967

United States Patent Office
3,504,125
Patented Mar. 31, 1970

3,504,125

NETWORK SYNCHRONIZATION IN A TIME DIVISION SWITCHING SYSTEM

Hiroshi Inose, Hiroya Fujisaki, and Tadao Saito, Tokyo, Japan, assignors to Bell Telephone Laboratories, Incorporated, Murray Hill, N.J., a corporation of New York Filed July 19, 1967, Ser. No. 654,483
Claims priority, application Japan, Feb. 10, 1967, 42/8,197
Int. Cl. H04j 3/06
U.S. Cl. 179—15 11 Claims

ABSTRACT OF THE DISCLOSURE

Mutual synchronization of operations performed in locations remote from one another is disclosed in the environment of a communication system having switching centers interconnected on a time division multiplex basis for transmission of coded information. The phases of synchronization signals received from other centers at a fixed frame rate are compared individually with the locally generated signal and the comparison resultants utilized to correct the frequency and phase of the local generator. Phase deviations due to transmission delays between two widely separated centers are overcome by adjusting the delay at the input of each of the two centers in accordance with the sum of the phase comparison resultants for the two centers.

BACKGROUND OF THE INVENTION

The operational timing control problem in a communication system having widely scattered switching centers which are interconnected on a time division multiplex basis may be solved by designating a particular center as the master clock source for the timing of operations throughout the system. Slave clocks in each of the other centers which direct the timing control only in the corresponding center are constrained to have the same timing frequency as that originating at the master center.

This master-slave relationship for timing control has several disadvantages arising primarily from the varying transmission characteristics between the master control center and each of the slave control centers. Also of primary concern in a communication system which cannot afford long out-of-service intervals, a device failure occurring in the master timing control or in one or more of the transmission links between the master center and the slave centers may be catastrophic. Apparatus required to safeguard against or correct for such a failure is exceedingly complex and not completely fail safe regardless of the precautions taken.

An alternate approach which has proven feasible is designated as mutual synchronization. This approach abandons the master-slave or autocratic relationship in favor of a democratic approach in which each switching center of the network influences the timing of the entire network as much as any of the others but no more. Thus the frequency of the timing wave originating at a particular switching center has a like influence on the frequencies of timing waves originating at each of the other switching centers in determining the ultimate frequency of the timing wave that synchronizes the entire network. An arrangement of this type is described in H. Inose et al. patent application Ser. No. 603,892, filed Dec. 22, 1966, now Patent 3,483,330, issued Dec. 9, 1969.

According to the cited Inose et al. arrangement, the phase of a synchronization signal received from each of the other centers is compared with the phase of the synchronization signal generated at the local center and the sum of the error signals produced by the phase comparing circuits is utilized to adjust the frequency of the locally generated signals.

This arrangement is particularly effective in systems in which the interconnected centers are in close proximity. The synchronization signal comprises a sequence of pulses which are transmitted in a distinct time channel at repetitive frame intervals. The effect of transmission delay between centers then is substantially overcome by adjusting the delay to be an integral multiple of the frame interval.

In such confined systems any deviation from the adjusted value is so slight as not to influence the system frequency. When, however, the distance between centers is increased substantially, this adjusted delay deviation may increase to a level which seriously affects the system frequency unless otherwise regulated.

SUMMARY OF THE INVENTION

The fixed delay employed in the cited Inose et al. arrangement is supplemented by a variable delay at the terminus of each intercenter transmission highway. This variable delay is controlled by the sum of the outputs of the phase comparators in the respective sending and receiving centers, which comparators receive frame synchronization signals from the highway extending between the two centers. Advantageously, additional time channels in the highway are utilized to transmit the phase difference information between the two centers.

This arrangement serves to stabilize the operating point of each of the phase comparators as well as to simplify other phase correction circuitry required in each center. Furthermore, if the integral of the sum of the two phase comparator outputs is utilized to adjust the variable delay, the effects of transmission delay can be virtually eliminated. This is accomplished in accordance with one embodiment of the invention by employing a servo-mechanism capable of integrating the variable delay input.

DRAWINGS

DETAILED DESCRIPTION

Figure 1:
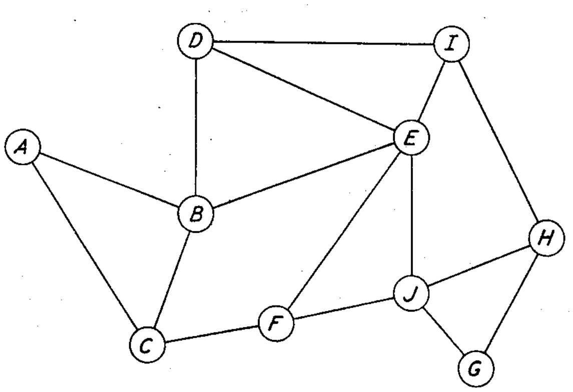
FIG. 1 is a schematic representation of a network of interlinked time division switching centers in which the arrangement in accordance with this invention may be employed.

Referring now to the drawing, FIG. 1 illustrates a system comprising a network of switching centers in which the illustrative embodiment of this invention may be utilized. Each switching center is represented by a small circle and a letter designation. Each of the centers is connected with at least two of the other centers via a two-way communication link represented in FIG. 1 by a single straight line. It is contemplated that in practice the network may be many times as large as that shown and may encompass hundreds or even thousands of switching centers.

The network is composed of a number of closed loops in the form of triangles, with a switching center at the node of each angle. An illustrative one of these triangles in the left-hand portion of the figure is that composed of the nodes A, B and C, in which node A is linked with nodes B and C, node B is linked with nodes A and C, and node C is linked with nodes A and B, each link being a two-way communication path.

In FIG. 1, as generally in practice, each switching center is also linked to one or more other switching centers. Thus node C is also linked to node F, while node B is also linked to node D and to node E. Our invention will be considered in terms of such a triangular arrangement of switching centers as an illustration.

Figure 2:
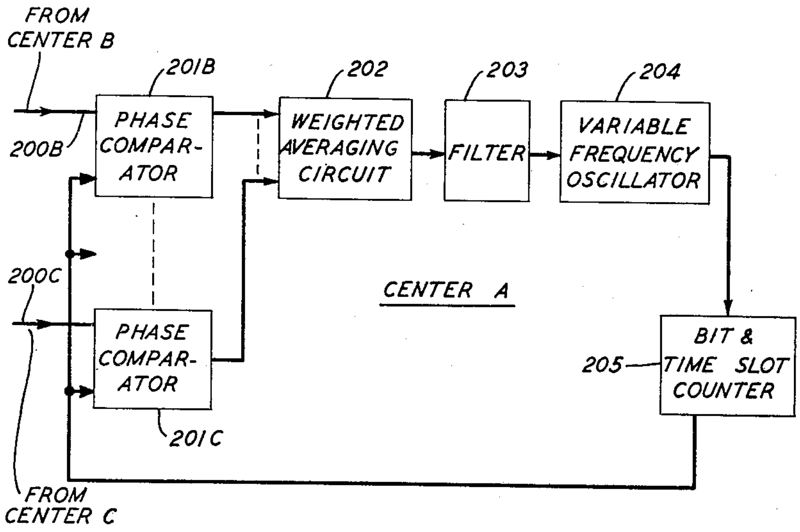
FIG. 2 is a schematic representation in block diagram form of the basic frequency synchronization equipment provided at each of the switching centers in the system depicted in FIG. 1.

In a mutual synchronization system, as disclosed in the aforementioned Inose et al. system, each of the centers is provided with a frequency synchronization arrangement basically as illustrated in FIG. 2. Each center thus contains as many phase comparators 201B, 201C as the centers to which it is connected. Considering the arrangement illustrated in FIG. 2 as representing the frequency synchronization unit for center A, FIG. 1, frame pulses from centers B and C are applied via leads 200B and 200C respectively to phase comparators 201B and 201C for subsequent comparison with the locally generated frame pulse obtained from bit and time slot counter 205. A weighted averaging circuit 202 adds together the outputs of the phase comparators and transmits the resultant error signal through filter 203 to adjust variable frequency oscillator 204. Bit and time slot counter 205 in turn counts down the oscillator output to provide the desired operational timing signals for local control and intercenter synchronization.

Figure 4:
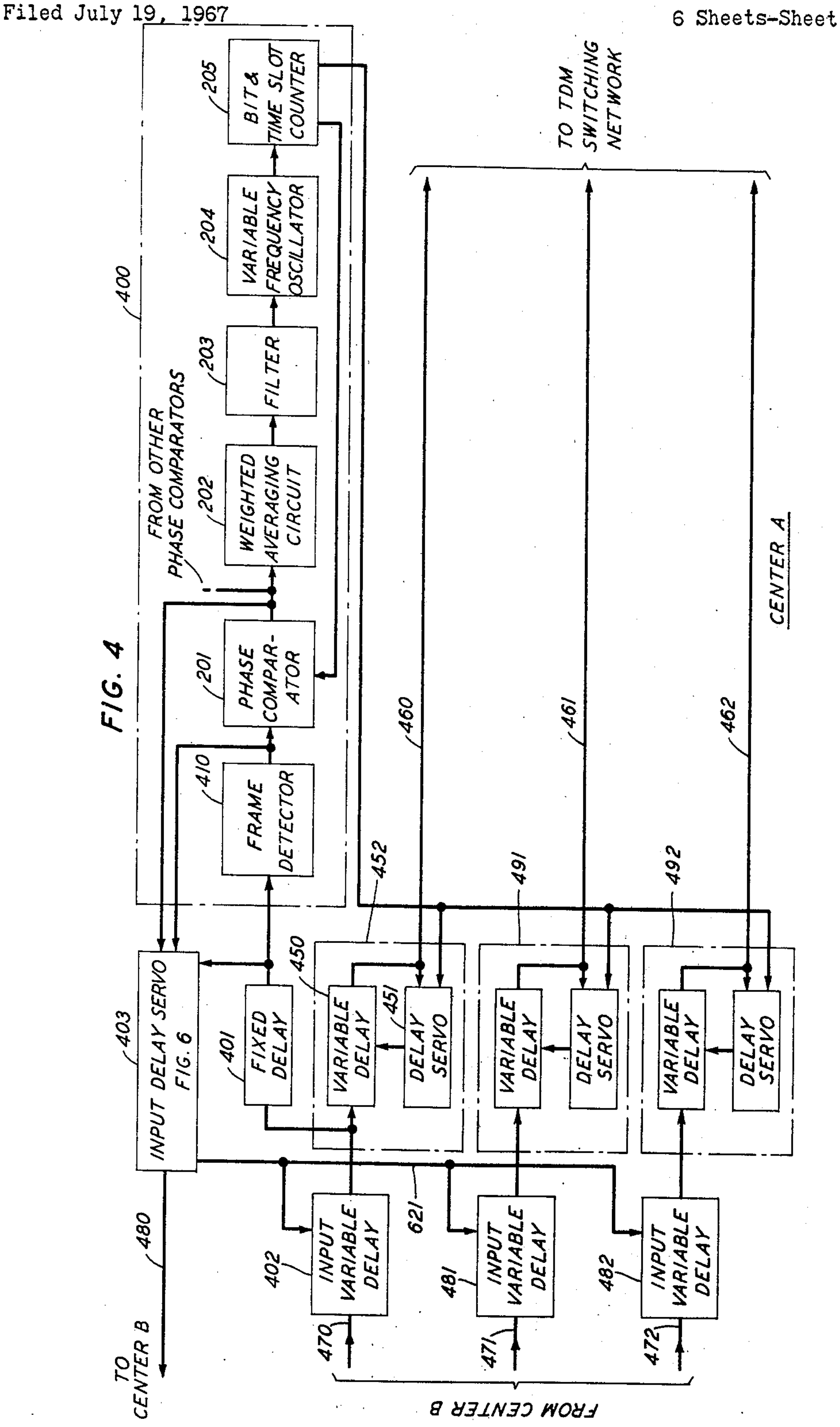
FIG. 4 is a schematic representation in block diagram form of the mutual synchronization equipment provided at each of the switching centers in the system depicted in FIG. 1.

Certain aspects of the mutual synchronization operation are depicted in FIG. 4 with reference to centers A and B only. Thus the synchronization arrangement at center A receives signals from center B via three time division multiplex transmission highways 470, 471 and 472, representing a plurality of such highways as may be required to carry all of the desired communication between the two centers. Of these, highway 470 carries the frequency synchronization information between the two centers. The frame pattern, advantageously transmitted in a particular time slot or channel on highway 470, is detected by frame detector 410 and applied to phase comparator 201.

Figure 5:
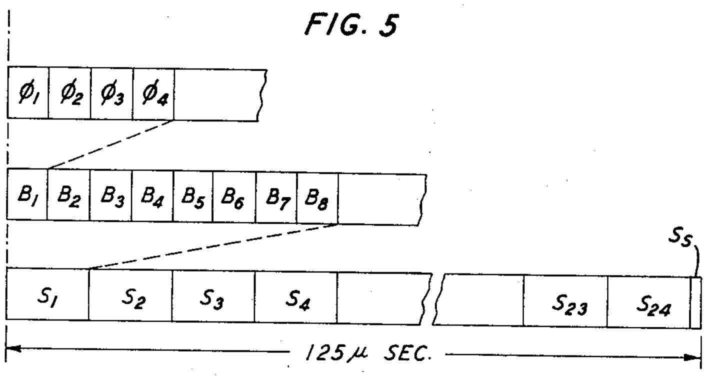
FIG. 5 is a representation of the timing signals utilized throughout the system.

In the aforementioned Inose et al. arrangement bit and time slot counter 205, FIG. 4, receives a 6.176 megahertz signal from oscillator 204. From this signal, as indicated in FIG. 5, a 125 microsecond frame is derived consisting of twenty-four time slots $S_1$–$S_{24}$, each of approximately a 5.2 microsecond duration, and a single time slot $S_s$ of one bit length. Each time slot other than $S_s$ in turn consists of eight bits $B_1$–$B_8$, each bit having approximately a 650 nanosecond duration and consisting of four phases $\varphi_1$–$\varphi_4$, each having approximately a 160 nanosecond duration. A single pulse is transmitted in each 650 nanosecond period, i.e., a bit length, on a transmission highway.

Information is coded in PCM form, each signal consisting of eight bits and being included in a time slot assigned to the particular calling party out of a total of twenty-four time slots available in each frame on a single highway. In order to perform the mutual synchronization operation, the first time slot in each frame is reserved for transmission of the synchronization pattern, thus limiting the time slots available for communication to a total of twenty-three.

Frame detector 410, FIG. 4, recognizes the synchronization pattern in $S_1B_8\varphi_2$. An indication of the exact demarcation between successive frames of an incoming pulse train is applied to the corresponding phase comparator 201 which may comprise a simple flip-flop circuit having this indication as its reset input. The control or toggle input is the frame pulse from bit and time slot counter 205 in the precise time slot, bit and phase at which the demarcation between successive frames occurs in the local office. The control input which serves to change the existing state of the flip-flop is applied to the phase comparator 180° out of phase with the incoming pulse train signal so that the output taken from the set side of the flip-flop normally extends over a one-half frame interval. Any output produced by phase comparator 201 having a duration of more or less than this one-half frame interval constitutes an error in phase, which as illustrated in FIG. 2 is combined with the signals produced by all of the other phase comparators in weighted averaging circuit 202 to adjust the phase of the local oscillator 204.

Upon completion of this comparison operation, system frequency is closely aligned. However, a bit phase difference may exist despite the correction achieved in the frequency synchronization circuit. This slight phase difference is corrected by a phase synchronization circuit such as 452 comprising a variable delay line 450 and a delay servo-mechanism 451 provided for each incoming highway from each interconnected center. Upon correction for this minor phase difference, the synchronized signal is applied to the local time division switching network via the corresponding conductors 460–462 for transmission to the TDM switching network.

One factor contributing to a loss of synchronism in the system is the fluctuation in delay encountered in transmitting the signals between interconnected centers. So long as the transmission highways are of relatively short length, as between centers B and C in FIG. 1, such transmission delay may be substantially overcome by adjusting the delay at the highway terminus to be an integral multiple of the frame frequency. For example, with a frame length of 125 microseconds, input signals on highway 470, FIG. 4, will encounter the normal highway transmission delay plus the delay of input variable delay line 402 and fixed delay line 401 before reaching frame detector 410. If all of these delays are adjusted so that successive signals from the same source will arrive at 125 microsecond intervals or integral multiples thereof, minor fluctuations in delay time can be readily overcome. However, such an expedient is not practical with transmission highways of considerable length, such as between centers A and B, since in such instances transmission delay fluctuations about the frame interval or its integral multiples may be quite drastic.

Figure 3:
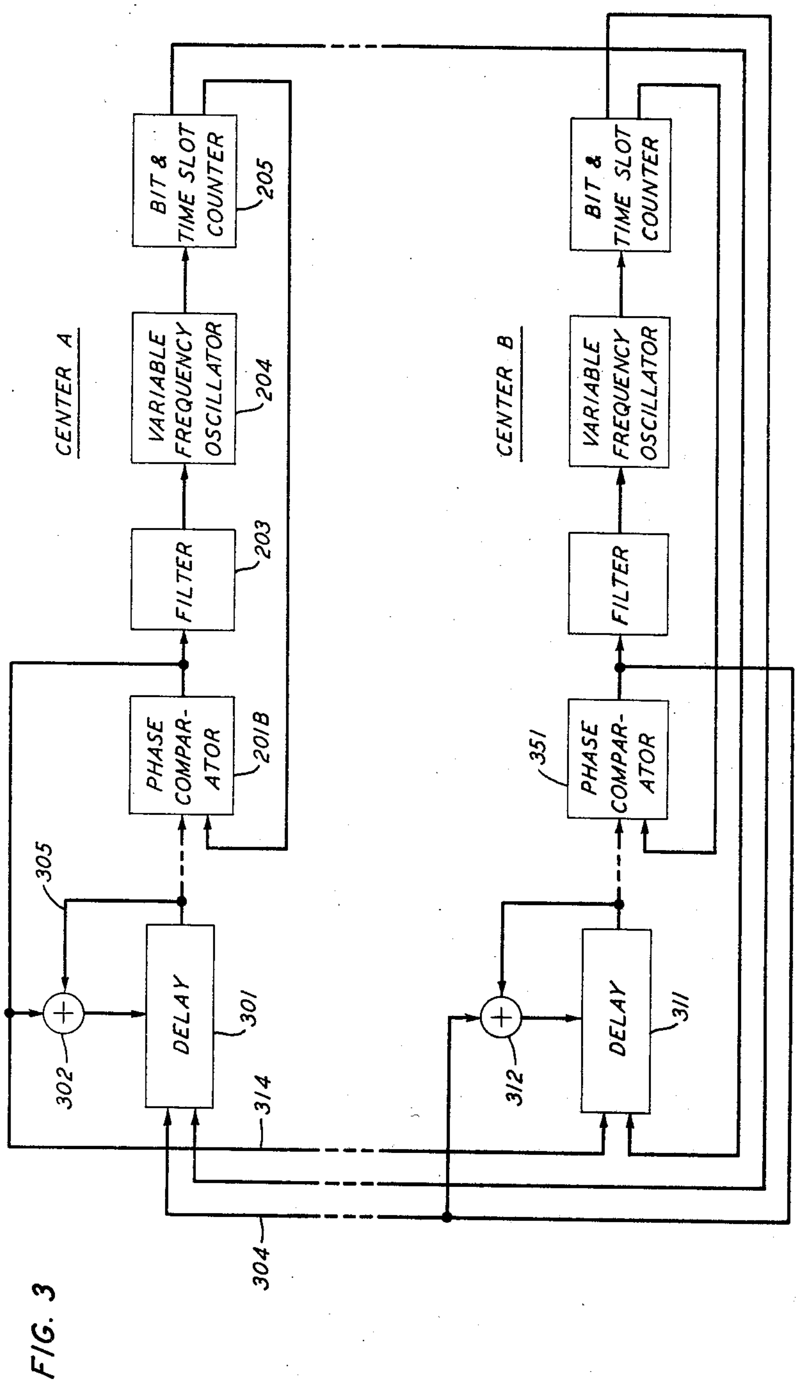
FIG. 3 is a schematic representation of variations in the frequency synchronization equipment depicted in FIG. 2 in accordance with one embodiment of this invention.

In accordance with one embodiment of this invention, such fluctuations about the integral multiples of the prescribed frame interval are overcome, as noted in FIG. 3, by summing the outputs of phase comparator 201B in sending center A and phase comparator 351 in receiving center B and utilizing the summation of these phase comparator outputs to adjust the delay to which incoming signals are exposed in the respective centers. Thus in center A the phase comparator outputs are applied to summing circuit 302 and the summation to delay 301 while in center B the phase comparator outputs are applied to summing circuit 312 and the resultant to delay 311.

Each phase comparator output is applied directly to the summing circuit in its own center and via a transmission highway to the delay apparatus in the other center. Thus the output of phase comparator 201B in center A is applied directly to summing circuit 302 and via highway 314 to delay 311 in center B. Similarly the output of phase comparator 351 in center B is applied directly to summing circuit 312 and via highway 304 to delay 301 in center A. The outputs of the delay apparatus in turn are applied to the corresponding summing circuits, e.g., delay 301 in center A applies its output to summing circuit 302 via lead 305. Highways 304 and 314 are merely illustrative and advantageously each may comprise a single time channel in a corresponding one of the intercenter transmission highways, such as 200B in FIG. 2.

The effect of this action may be seen from a consideration of the correction achieved by the arrangement illustrated in FIG. 2 as compared to that achieved by the FIG. 3 arrangement. Thus denoting the output of phase comparator 201B, FIG. 2, as $PS_{BA}$, the following equation is provided:

$$PC_{BA}=\varphi_A-\varphi_B+f_s d_{BA}-k_{BA} \quad (1)$$

where $\varphi_A$ is the frame phase in center A,
$\varphi_B$ is the frame phase in center B,
$f_s$ is the system frequency,
$d_{BA}$ is the delay encountered in transmission from center A to center B, and $$k_{BA}=[\varphi_A-\varphi_B+f_s d_{BA}+\tfrac{1}{2}]$$

[] denoting the interger part of the expression in the Gaussian notation.

The equation for a corresponding phase comparator in center B would be:

$$PC_{AB}=\varphi_B-\varphi_A+f_s d_{AB}-k_{AB} \quad (2)$$

For system stability $d_{BA}$ or $d_{AB}$ is adjusted initially so as to be an integral multiple of a frame period. Thus in Equations 1 and 2 this delay may equal $k_{BA}$ or $k_{AB}$ respectively.

In a confined area with relatively short distances between centers any variation in transmission delay is so minute as not to influence the system frequency. However, as the distance between offices is increased, so too is the effect of variation in transmission delay on the system frequency. To avoid this influence a variable delay may be provided at the input of each phase comparator. This delay may be adjusted in accordance with the output of the corresponding phase comparator. However, as indicated in Equations 1 and 2 the phase comparator output $PC_{BA}$ or $PC_{AB}$ contains a variable factor concerning the difference in phase $\varphi$ between the centers in addition to the transmission delay factor $d$. Consequently adjusting the variable delay with the output of the phase comparator to compensate for variations in transmission delay must necessarily affect the phase factor as well. The presence of the phase and delay factors presents an extremely difficult task to the designer of variable delay apparatus which will isolate and correct for the transmission delay factor without affecting the phase factor.

In accordance with this embodiment of the invention, the variable delay at the input to each phase comparator in each center is controlled by the sum of the outputs of the phase comparators at the respective sending and receiving centers. The sum of the phase comparator outputs indicated in Equations 1 and 2 would be:

$$PC_{BA}+PC_{AB}=f_s(d_{AB}+d_{BA})-(k_{AB}+k_{BA}) \quad (3)$$

As noted in Equation 3 the phase factor $\varphi$ drops out so that the sum of the phase comparator outputs corresponds to the variation in delay encountered between the two offices. A center having this phase comparison sum available thus may control the variable delay at the phase comparator input to correct for departures from the expected frame position of the incoming signal.

This situation may be analyzed mathematically as it exists between two centers, FIG. 3, each center having available the sum of the phase comparator outputs of both centers, i.e., a control signal corresponding to Equation 3 is available at the output of summing circuits 302 and 312 in centers A and B respectively. The delay available in input variable delays 301 and 311 may be expressed as $\delta_{BA}$ and $\delta_{AB}$. Thus by adjusting the variable delay with the sum of the phase comparator outputs, Equation 3, the following expressions for the variable delay may be derived:

$$\delta_{AB}=\frac{\beta_{AB}(PC_{AB}+PC_{BA})}{2}$$

and $$\delta_{BA}=\frac{\beta_{BA}(PC_{AB}+PC_{BA})}{2} \quad (4)$$

Then:

$$PC_{AB}=\varphi_B-\varphi_A+f_s d_{AB}-\frac{\beta_{AB}(PC_{AB}+PC_{BA})}{2}-k_{AB}$$

$$PC_{BA}=\varphi_A-\varphi_B+f_s d_{BA}-\frac{\beta_{BA}(PC_{AB}+PC_{BA})}{2}-k_{BA} \quad (5)$$

Each center has its variable frequency oscillator controlled by an amount proportional to PC. Expressing the corresponding proportional constants by $\alpha_{AB}$ and $\alpha_{BA}$ and central frequencies by $f_{oB}$ and $f_{oA}$ respectively, the following equations are given:

$$f_s=f_{oA}-\alpha_{BA}PC_{BA}$$

and $$f_s=f_{oB}-\alpha_{AB}PC_{AB} \quad (6)$$

By applying Equations 5 and 6 the system frequency $f_s$ becomes:

$$f_s=\frac{\dfrac{f_{oA}}{\alpha_{BA}}+\dfrac{f_{oB}}{\alpha_{AB}}+\dfrac{k_{AB}+k_{BA}}{1+\dfrac{\beta_{AB}+\beta_{BA}}{2}}}{\dfrac{1}{\alpha_{BA}}+\dfrac{1}{\alpha_{AB}}+\dfrac{(d_{AB}+d_{BA})}{1+\dfrac{\beta_{AB}+\beta_{BA}}{2}}} \quad (7)$$

The system frequency provided by the system in FIG. 3 indicated in Equation 7 may be called the proportional control system since the variable delay $\delta$ is adjusted proportionate to the sum of the phase comparator outputs. This results in a reduction in the effect exerted upon the system frequency by the phase and transmission delay factors to a fractional part of the effect exerted by these factors in the system illustrated in FIG. 2. That fractional part is $$1+\frac{\beta_{AB}+\beta_{BA}}{2}$$

In addition, the sum of the phase comparator outputs may be integrated prior to its application to the input variable delay 301 and 311. This in effect will increase $\beta_{AB}+\beta_{AB}$ virtually to infinity, thereby completely eliminating the effects of the $d$ and $a$ terms from Equation 7. Thus the equation for the variable delay becomes:

$$\delta_{AB}=\frac{\gamma_{AB}}{2}\int(PC_{AB}+PC_{BA})dt \quad (8)$$

and the system frequency becomes:

$$f_s=\frac{\dfrac{f_{oA}}{\alpha_{BA}}+\dfrac{f_{oB}}{\alpha_{AB}}}{\dfrac{1}{\alpha_{BA}}\dfrac{1}{\alpha_{AB}}} \quad (9)$$

This arrangement, of course, permits a system operation in which the mutually synchronized system frequency is freed completely from the influence of interoffice transmission delay.

Figure 6:
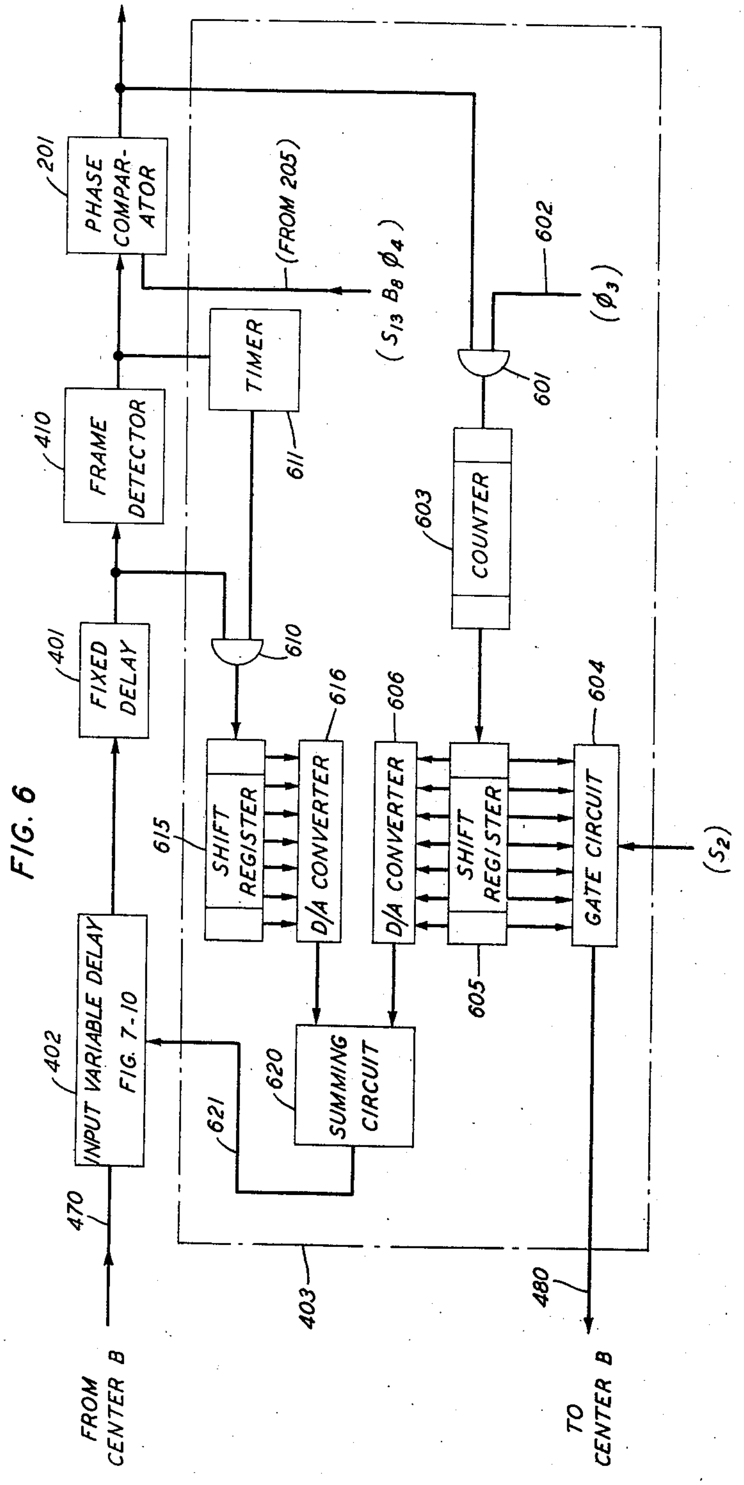
FIG. 6 is a schematic representation in greater detail of the servo-mechanism depicted in FIG. 4.

FIG. 6 illustrates the input delay servo arrangement 403 in accordance with one embodiment of this invention. Phase comparator 201 emits pulses which extend over approximately one half frame or 62.5 microseconds, dependent upon the phase relationship between the incoming signals and the locally generated signals. A clock signal is applied to AND gate 601 in phase $\varphi_3$ of each bit interval so that AND gate 601 will provide approximately 97 pulses per frame or one-half the number of bits generated in each frame.

Seven-digit binary counter 603 permits the quantizing of each input signal to within one bit interval or 650 nanoseconds. If the correction for transmission delay should require a higher degree of precision the entire set of phase pulses $\varphi_1$–$\varphi_4$ may be applied to AND gate 601 in each bit interval, counter 603 being expanded accordingly to accommodate the extended count. The content of counter 603 is applied to shift register 605 which in turn is read out in parallel binary form once in each frame, e.g., in time slot $S_2$ through gate 604 for transmission via lead 480 representing one time channel in a highway between centers A and B, in binary form to center B as a train of seven bit pulses occupying time slot $S_2$.

Consider now that the binary count corresponding to the phase comparator output from center B arrives in center A and is applied through AND gate 610 to shift register 615. Frame detector 410 generates pulses at $S_1B_8\varphi_2$ which activate timer 611, advantageously comprising a monostable multivibrator, to enable AND gate 610 in the proper time slot, $S_2$ in this instance. Thus $PC_{BA}$ and $PC_{AB}$ will be stored in shift registers 605 and 615 at office A in time slot $S_2$. This stored information is converted to analog form in converters 606 and 610 and added algebraically in summing circuit 620, the output of which corresponds to $PC_{AB}$ and $PC_{BA}$ and is utilized via lead 621 to adjust input variable delay 402.

Figure 7:
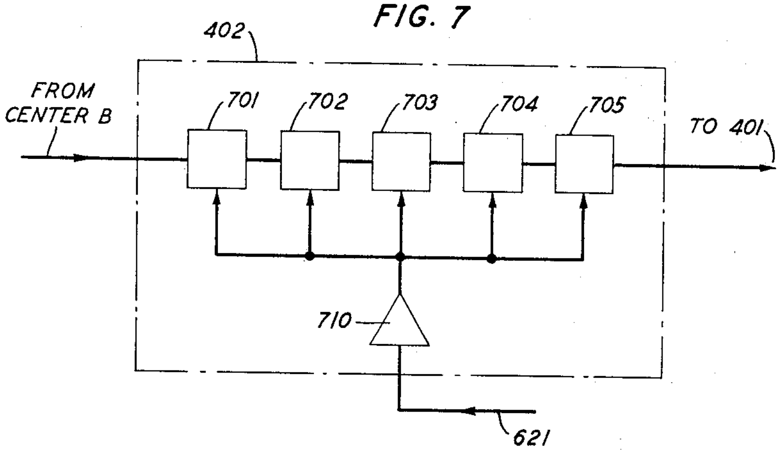
FIGS. 7–10 illustrate in block diagram form distinct forms of the variable delay line depicted in FIG. 3.

FIG. 7 depicts one form of input variable delay 402 utilizing multivibrators 701–705, which arrangement satisfies the requirement for proportional control (Equation 7). A single monostable multivibrator may have a delay time in the range of 100–600 nanoseconds so that five such multivibrators connected in series will provide the desired delay range of 500 nanoseconds to 3 microseconds. Of course if more delay is required additional multivibrators may be added to the series path. Amplifier 710 applies the control signal received from the summing circuit 620 via lead 621 to the multivibrators in parallel so as to control the delay proportional to $PC_{AB}+PC_{BA}$.

Figure 8:
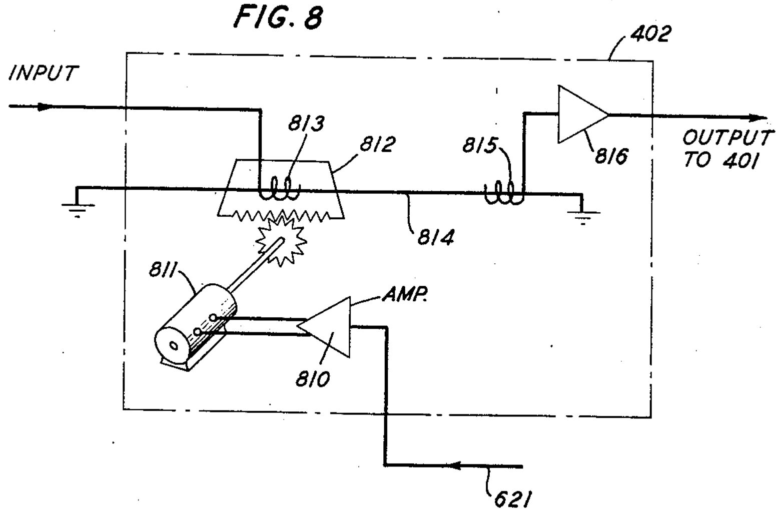

FIG. 8 depicts another form of variable delay, which arrangement satisfies the requirements for integral control (Equation 9). Such an arrangement is in accordance with the disclosure in W. A. Malthaner Patent 2,960,571, issued Nov. 15, 1960. Input coil 813 is moved along magnetostrictive delay line 814 under control of motor 811 through gearing 812 so as to vary the delay time provided by delay line 814. Output coil 815 is fixed in position, and the output taken from delay line 814 at this point is amplified and applied to fixed delay 401. Motor 811 is driven by amplifier 810, and input coil 813 is kept moving even though the control signal $PC_{AB}+PC_{BA}$ arriving on conductor 621 is zero, integration of the previous change in control signal establishing the current delay time.

Figure 9:
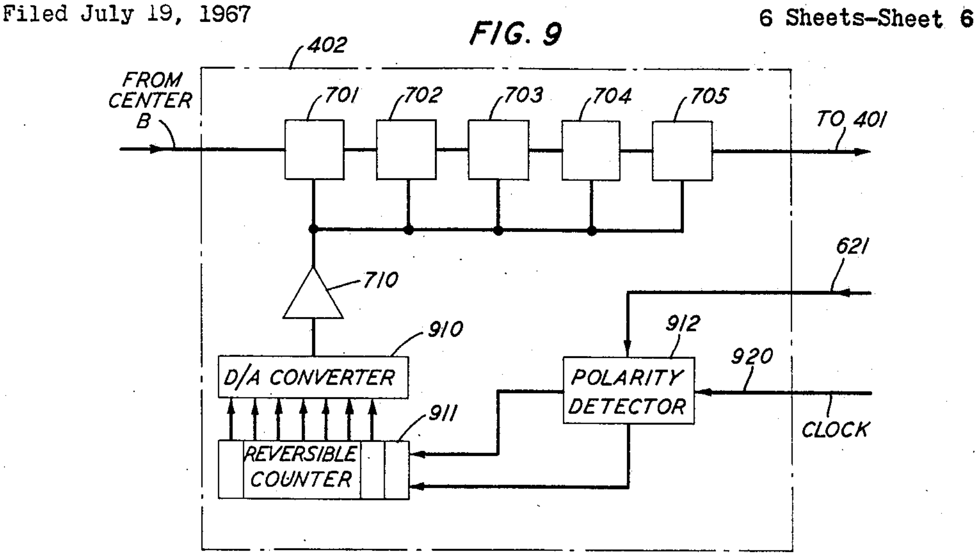

Still another form of variable delay mechanism which may be incorporated in this embodiment of the invention to satisfy Equation 9 is illustrated in FIG. 9. The servo control portion may be considered as the electronic equivalent of the mechanical portion of the variable delay mechanism illustrated in FIG. 8, and the variable delay itself corresponds to that illustrated in FIG. 7. The signal for controlling variations in the delay is applied via conductor 621 to polarity detector 912, FIG. 9, the output of which is clocked via lead 920, according to the desired signal polarity, and applied to reversible counter 911. The least significant digit or digits stored in counter 911 may be utilized to overcome noise, with the balance of the signal being applied to converter 910. In this manner any erroneous signals by the polarity detector 912 resulting from noise will not affect the signal controlling the delay mechanism. Thus the precise desired control signal in analog form is applied through amplifier 710 to the series connected multivibrators 701–705.

Figure 10:
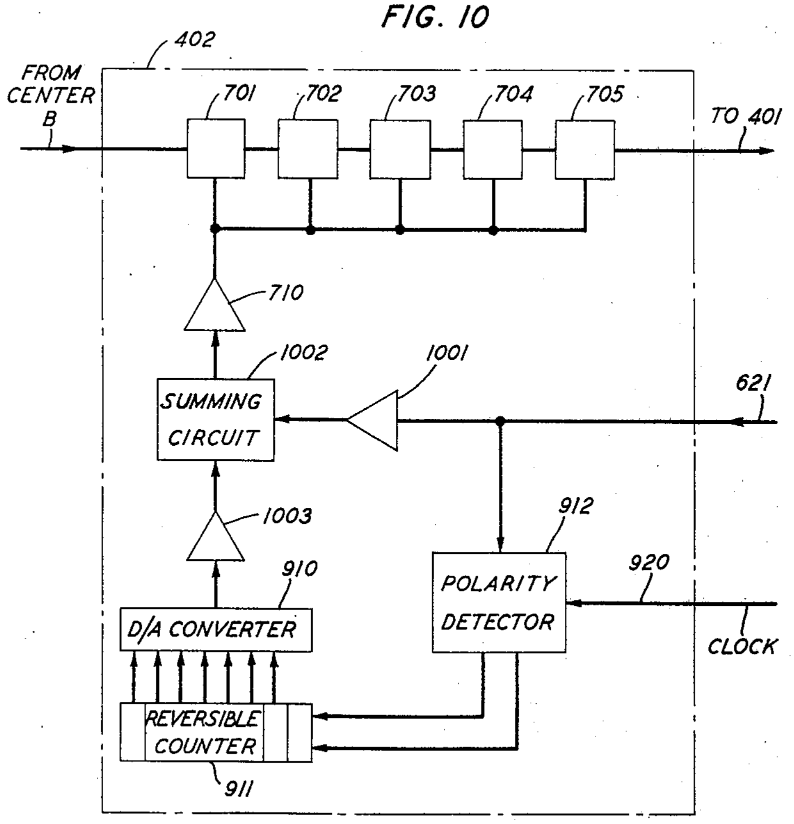

One difficulty which may be encountered in the arrangement illustrated in FIG. 9 results from reversible counter 911 in the servo control loop introducing an additional delay. This additional delay factor may be obviated by the arrangement illustrated in FIG. 10. As noted therein the incoming control signal on lead 621 is applied to summing circuit 1002 via amplifier 1001 as well as to polarity detector 912. The noise reduction loop including reversible counter 911 and converter 910 operates as indicated in the arrangement of FIG. 9 to prevent the noise from polarity detector 912 reaching summing circuit 1002 through amplifier 1003. This slightly delayed input to summing circuit 1002 is combined with the original incoming signal and applied to amplifier 710.

In similar fashion particularly rapid control of the input variable delay 402 may be achieved by adding a term proportional to the differential produced in summing circuit 620 to its output and the integration thereof.

The variable delay line illustrated in FIG. 7 permits transmission delay to be reduced so as to provide a system frequency as set forth in Equation 7 and since the variable term $$\frac{\beta_{AB}+\beta_{BA}}{2}$$

is controlled by amplifier 710, the interoffice delay may be reduced to a negligible amount with this arrangement. The variable delay arrangements illustrated in FIGS. 8 and 9 permit complete removal of the influence of transmission delay on system frequency. Similar results are achieved in the arrangement according to FIG. 10, with the additional advantage of eliminating delay in response of the servo control mechanism.

Each of the transmission lines extending from center B to center A is provided with an individual input variable delay. Thus, as noted in FIG. 4, transmission lines 470–472 from center B terminate on corresponding input variable delays 402, 481 and 482, respectively. All of the input variable delays in center A which serve center B are under the control of a signal input delay servo 403. With this arrangement the individual phase synchronization units 452, 491 and 492 may be provided with shorter variable delays than previously employed to correct incoming signals on the corresponding transmission lines 470–472. Only input variable delay 402 which transmits its output through the frequency synchronization unit 400 need be provided with a variable delay mechanism of the types illustrated in FIGS. 7–10. The delay in other incoming transmission lines such as delay 481 and 482 may be of the fixed type, in which case the variable delay in the corresponding phase synchronization units 491 and 492 would be determined in accordance with the disclosure in the aforementioned Inose et al. application.

It is to be understood that the above-described arrangement is illustrative of the application of the principles of the invention. Numerous other arrangements may be devised by those skilled in the art without departing from the spirit and scope of the invention.

We claim:

1. In a time division multiplex communication system comprising a plurality of control centers including a local center, means at said local center for establishing and maintaining synchronism among all of the centers comprising: means for defining a sequence of time slots in repetitive frame intervals, means for transmitting a synchronization signal to each of the other centers, variable delay means receiving signals from each of the other centers, means connected to said variable delay means for detecting synchronization signals received from each of said other centers, means for comparing the phase of said detecting means output with the phase of the synchronization signal generated in said local center, means for applying the output of said phase comparing means from each of two of said centers to said variable delay means in each of said two centers to adjust the incoming synchronization signal for transmission delay between said two centers, and means for utilizing said phase comparing means output to adjust the frequency of signals generated by said time slot defining means.

2. In a communication system comprising a plurality of interconnected control centers each of which acts as a sending and a receiving center, means in each center for overcoming the effects of intercenter transmission delay on the mutual synchronization of operational timing comprising; a frequency synchronization unit including a circuit for comparing the phase of a synchronization signal received from sending ones of said centers with the phase of a synchronization signal generated by the receiving one of said centers, means for combining the outputs of said phase comparing circuits at each of said receiving centers, delay means for applying signals received from said sending centers to said phase comparing means at said receiving center, and means for adjusting said delay means with the output of said combining means to compensate for deviations from the expected arrival time of said signals.

3. In a communication system, the combination in accordance with claim 2 wherein said combining means comprises means for producing the sum of said phase comparing circuit outputs.

4. In a communication system, the combination in accordance with claim 2 wherein said adjusting means comprises means for integrating the output of said combining means.

5. In a communication system comprising a plurality of interconnected control centers a circuit arrangement for overcoming the effects of intercenter transmission delay on the mutual synchronization of operational timing comprising: a frequency synchronization unit at each of said centers including a circuit for comparing the phase of a synchronization signal received from a sending one of said centers with the phase of a synchronization signal generated by the receiving center, said frequency synchronization unit further including means for combining the outputs of said phase comparing circuits at each of said centers to adjust variable delay means, said delay means connected to apply signals received from said sending centers to said phase comparator at said receiving center.

6. In a communication system comprising a plurality of interconnected control centers, a circuit arrangement for obviating intercenter transmission delay as it affects the mutual synchronization of operational timing among said plurality of interconnected control centers each comprising a frequency synchronization unit having means for comparing the phase of signals from a sending one of said centers with the phase of signals generated at a receiving one of said centers, said circuit arrangement comprising means for delaying incoming signals for a period of time proportional to the deviation from the expected transmission delay as determined by the outputs of said phase comparing means at each of said sending and receiving centers.

7. In a communication system, the combination in accordance with claim 6, wherein said incoming signal delay means comprises apparatus connected to the input of said phase comparing means in said receiving center.

8. In a communication system, the combination in accordance with claim 7, further comprising means for adjusting said delay apparatus by the integral of the sum of the output signals from said phase comparing means at each of said sending and receiving centers.

9. In a communication system, the combination in accordance with claim 7, further comprising means for adjusting said delay apparatus by the sum of the output signals from said phase comparting means at each of said sending and receiving centers.

10. In a communication system, the combination in accordance with claim 9, wherein said adjusting means comprises means for receiving said phase comparator output signals from each of said sending and receiving centers in a distinct time interval in a repetitive cycle of time intervals.

11. In a communication system, the combination in accordance with claim 9, wherein said adjusting means comprises counting means, means including a polarity detector for applying said phase comparing means output signals to said counting means, and means for applying the analog equivalent of a binary number less than that stored in said counting means to said delay apparatus.

References Cited

UNITED STATES PATENTS

| | | | |
|---|---|---|---|
| 3,453,594 | 7/1969 | Jarvis | 179—15 |
| 3,457,372 | 7/1969 | Karnaugh | 179—15 |

KATHLEEN H. CLAFFY, Primary Examiner

A. B. KIMBALL, Jr., Assistant Examiner